United States Patent
Francois et al.

(10) Patent No.: US 7,636,199 B2
(45) Date of Patent: Dec. 22, 2009

(54) OPTICAL DEVICE FOR SUPERPOSING ELECTRONIC IMAGES IN FRONT OF AN OBJECTIVE

(75) Inventors: Jean-Michel Francois, Cadaujac (FR); Jean-Louis Bourgain, Talence (FR)

(73) Assignee: Thales, Neuilly-sur-Seine (FR)

( * ) Notice: Subject to any disclaimer, the term of this patent is extended or adjusted under 35 U.S.C. 154(b) by 157 days.

(21) Appl. No.: 12/088,514

(22) PCT Filed: Sep. 28, 2006

(86) PCT No.: PCT/EP2006/066827

§ 371 (c)(1),
(2), (4) Date: Mar. 28, 2008

(87) PCT Pub. No.: WO2007/036550

PCT Pub. Date: Apr. 5, 2007

(65) Prior Publication Data

US 2008/0247048 A1    Oct. 9, 2008

(30) Foreign Application Priority Data

Sep. 29, 2005   (FR) ................................... 05 09951

(51) Int. Cl.
*G02B 27/14* (2006.01)
(52) U.S. Cl. ........................................ 359/631; 359/630
(58) Field of Classification Search ................. 359/423, 359/424, 434, 630, 631, 632, 633
See application file for complete search history.

(56) References Cited

U.S. PATENT DOCUMENTS

| | | | |
|---|---|---|---|
| 4,818,065 | A | 4/1989 | Ziph et al. |
| 5,502,455 | A | 3/1996 | Ferrin et al. |
| 5,764,417 | A | 6/1998 | Francois et al. |
| 5,822,126 | A | 10/1998 | Cursolle et al. |
| 6,301,052 | B1 * | 10/2001 | Carmeli .................. 359/630 |

FOREIGN PATENT DOCUMENTS

EP    0380035 A2    8/1990

OTHER PUBLICATIONS

English-Language Translation of International Preliminary Report on Patentability prepared for PCT/EP2006/066827 (Sep. 7, 2007).*
U.S. Appl. No. 08/258,219, filed Jun. 10, 1994, Jean-Michael Francois (Never Published, Abandoned).
U.S. Appl. No. 08/260,240, filed Jun. 14, 1994, Jean-Michael Francois et al. (Never Published, Abandoned Oct. 24, 1995).

* cited by examiner

*Primary Examiner*—David N Spector
(74) *Attorney, Agent, or Firm*—Lowe Hauptman Ham & Berner, LLP

(57) ABSTRACT

The field of the invention is that of optical devices allowing the superposition of an electronic image on an image coming from an external scenery. The subject of the invention is an optical device for superposing images, designed to be positioned in front of an optical module comprising at least an objective and a photosensitive surface positioned in the focal plane of said objective. The device comprises an image source, an optical relay and an optical combiner formed of two optical parts assembled via an approximately plane common face including a weakly reflective coating. The combiner has the general form of a plate with plane parallel faces, the common face being inclined at around 45 degrees to said plane faces. It has an entrance face and a opposing face that are approximately perpendicular to the plane faces, the opposing face having approximately the form of a reflecting spherical surface. This device applies in particular to night vision goggles where, when the optical combiner is placed in front of the objective of a goggles body, it allows superposition of an electronic image on the external scenery while introducing marginal attenuation.

7 Claims, 6 Drawing Sheets

OPTICAL DEVICE FOR SUPERPOSING ELECTRONIC IMAGES IN FRONT OF AN OBJECTIVE

CROSS-REFERENCE TO RELATED APPLICATIONS

The present Application is based on International Application No. PCT/EP2006/066827, filed on Sep. 28, 2006, which in turn corresponds to French Application No. 0509951 filed on Sep. 25, 2005, and priority is hereby claimed under 35 USC §119 based on these applications. Each of these applications are hereby incorporated by reference in their entirety into the present application.

BACKGROUND OF THE INVENTION

1. Field of the Invention

The field of the invention is that of optical devices allowing the superposition of an electronic image on an image coming from an external scenery.

2. Description of the Prior Art

For a certain number of applications it is useful to blend an electronic image into an image of an external scenery. Head-up displays used principally in the aeronautic field and more recently in the automobile field will be cited. In this case, an electronic image providing flight control or navigation information is superposed on the external scenery by means of an optical combiner placed in the visual field of the pilot. Helmet displays perform the same function. The optoelectronic assembly comprising the generation of images and the combiner are, in this case, placed in or on the pilot's helmet, the visor of the helmet being able to serve as the optical combiner.

To carry out night missions, aircraft pilots also have night vision goggles. These devices are also known by the acronyms JVN, standing for "Jumelles de Vision Nocturne", and NVG, standing for "Night Vision Goggles". Generally NVG comprise two identical binocular bodies positioned in front of the eyes of the observer. As indicated in FIG. 1, a night vision goggles body essentially comprises 3 principal elements, which are:

a focusing objective 10;

an amplifying device 13, possessing a first, photoemissive entrance surface 11 and a second, photosensitive exit surface 12; and an eyepiece 14.

The objective 10 forms an image of the external scenery on the photoemissive entrance surface 11. The optical image is then converted into an electrical signal that is amplified, then converted back into an intensified optical image on the second, photosensitive exit surface 12. This intensified image is observed by means of the eyepiece 14 by the eye 15 of the observer.

When the night vision goggles are used for piloting aircraft it is necessary to provide the pilot with certain flight control information. For pilot comfort and flight safety, it is desirable that this information be superposed directly within the intensified image.

One possible solution consists in using an optical device allowing the electronic image coming from the image source to be superposed at the entrance of the objective 10. This solution has the advantage of requiring only a very low-brightness image insofar as it is amplified by the goggles' intensifier. FIG. 2 illustrates this design. The optical image superposition device comprises an image source 20, a collimation optic 21 and an optical combiner 23. In the case shown in FIG. 2, the combiner 23 is a simple beam-splitting plate. The optical device may also comprise one or more folding mirrors 22. The light rays represented by the dotted lines coming from the image source after collimation by the collimation optic and reflection at the combiner are thus superposed on the light rays coming from the external scenery, represented by the thin continuous lines.

One of the difficulties of producing this type of device is producing the optical combiner. It must introduce minimum disturbance on the external scenery. In particular, the optical transmission of the scenery through the combiner must be excellent, higher than 90%. It must also be ensured that the device has a large depth of field. This is because the external scene may include objects at distances from a few meters to several hundred meters.

U.S. Pat. No. 4,818,065 by the company Elbit discloses a first embodiment of the combiner. This is formed by two prisms assembled via a common inclined face, said common face comprising a reflecting surface that is small in size compared to that of the aperture of the NVG objective. By this means, the disturbance introduced into the field of the objective is minimized.

U.S. Pat. No. 5,502,455 by the company Honeywell discloses a second embodiment of the combiner. In this case the combiner is a simple mirror placed on the optical axis of the NVG objective. Here again the small size of the mirror allows the disturbance introduced into the field of the objective to be minimized.

SUMMARY OF THE INVENTION

An object of the invention is to propose an alternative and compact optical solution, the combiner of which ensures very good transmission of the external scenery. This solution has an important advantage in relation to solutions of the prior art. It becomes possible for the pupil image of the optical device to coincide with the aperture of the objective. In this way, any vignetting of the field is avoided and a symbology is provided in a visual field as large as that of the objective.

More precisely, the subject of the invention is an optical device for superposing images, designed to be positioned in front of an optical module comprising at least an objective and a photosensitive or photoemissive surface positioned in the focal plane of said objective, said device comprising at least an image source and an optical combiner, said combiner:

being formed of two optical parts assembled via an approximately plane common face;

having the general form of a plate with plane parallel faces, said common face being inclined at around 45 degrees to said plane faces;

having an entrance face and a opposing face that are approximately perpendicular to said plane faces;

wherein the opposing face has approximately the form of a reflecting spherical surface and in that the common face has a weakly reflective coating, the reflection coefficient of this coating being less than 10% in the spectral band used by the photosensitive surface.

Advantageously, the reflection coefficient of this coating is less than 1% in the spectral band used by the photosensitive or photoemissive surface.

Advantageously, said device comprises an optical relay positioned between the image source and the optical combiner, arranged so as to provide an intermediate image of the image source approximately in the focal plane of the spherical surface of the opposing face.

Advantageously, the optical relay has an aperture that is small in size compared to that of the objective. This aperture may be positioned in such a way that its image forms, after reflection at the spherical surface, in the approximate vicinity of the common face. It may also be positioned in such a way that its image forms, after reflection at the spherical surface and at the common plate, substantially to the outside of the combiner, such that, when the device is placed in front of the objective, said pupil image forms inside the objective.

The invention also relates to night vision goggles comprising at least one objective, one light-intensifying device and one eyepiece, said goggles comprising an optical device for superposing images such as that defined above and placed in front of said objective.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and it several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

MORE DETAILED DESCRIPTION

Figure 1:
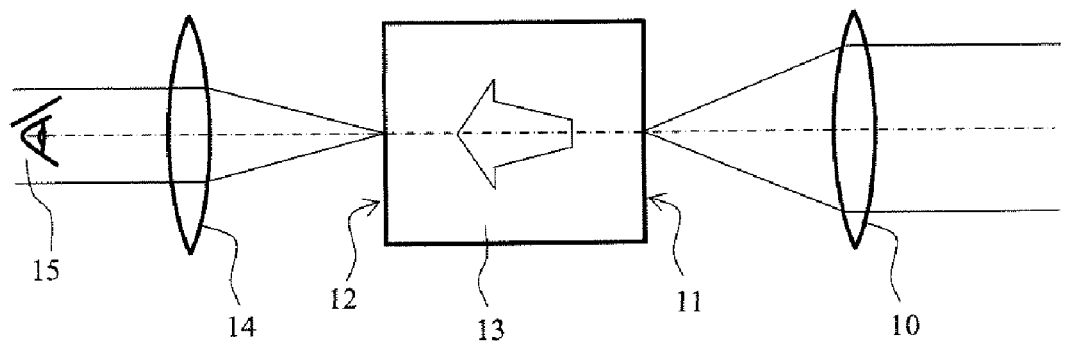
FIG. 1 is a diagram showing the principle of light-intensifying goggles.
Figure 2:
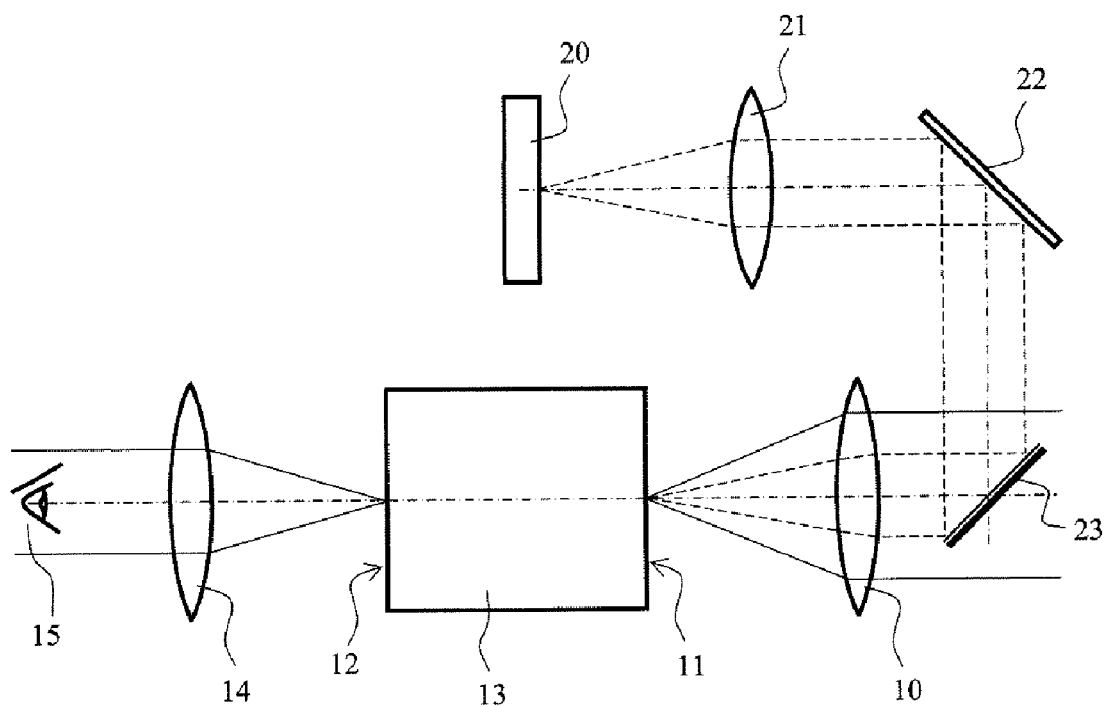
FIG. 2 shows the same goggles as that of FIG. 1, but provided with an optical device for the superposition of images.
Figure 3:
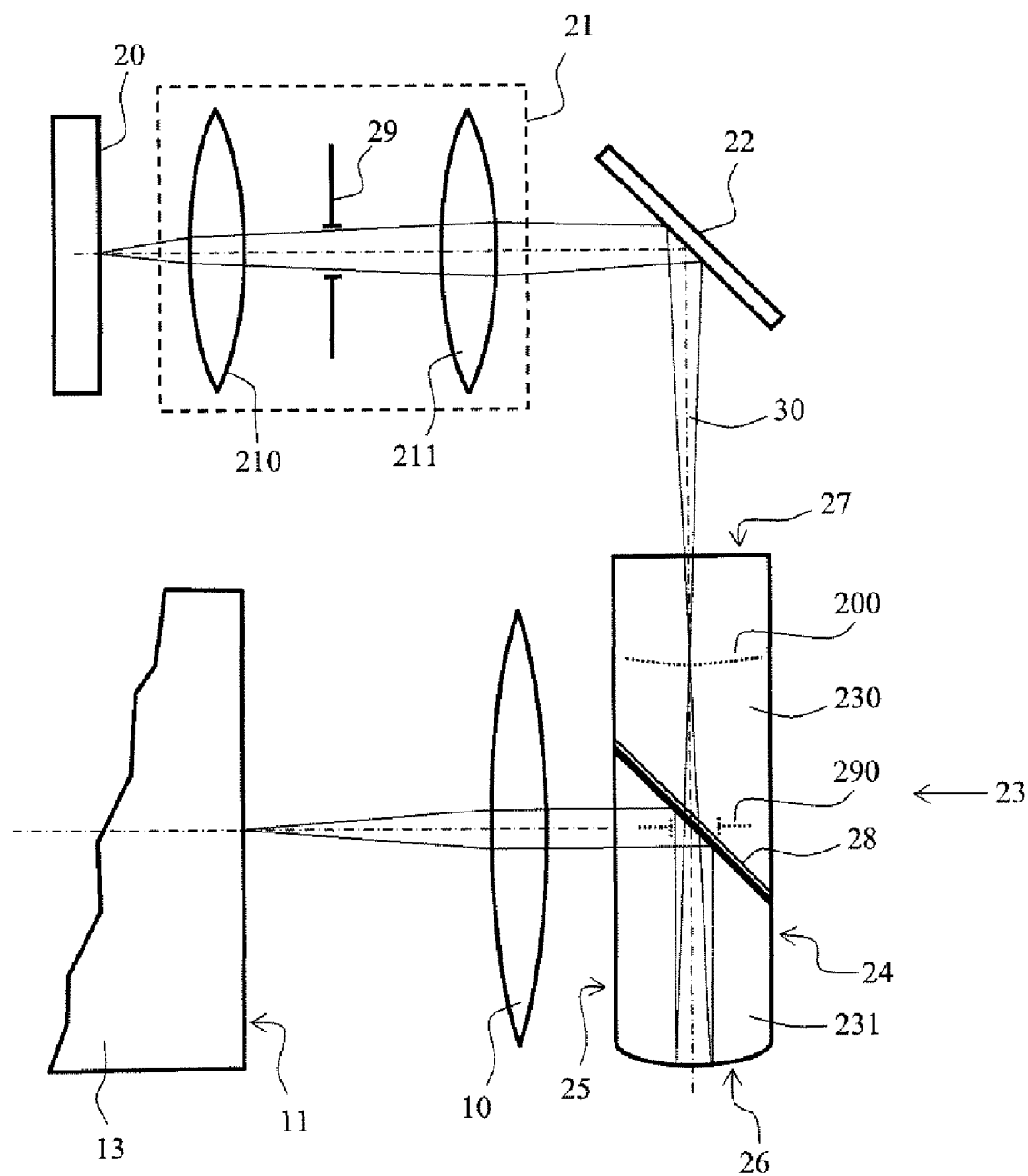
FIG. 3 shows a first view of the principle of a first optical device according to the invention.
Figure 4:
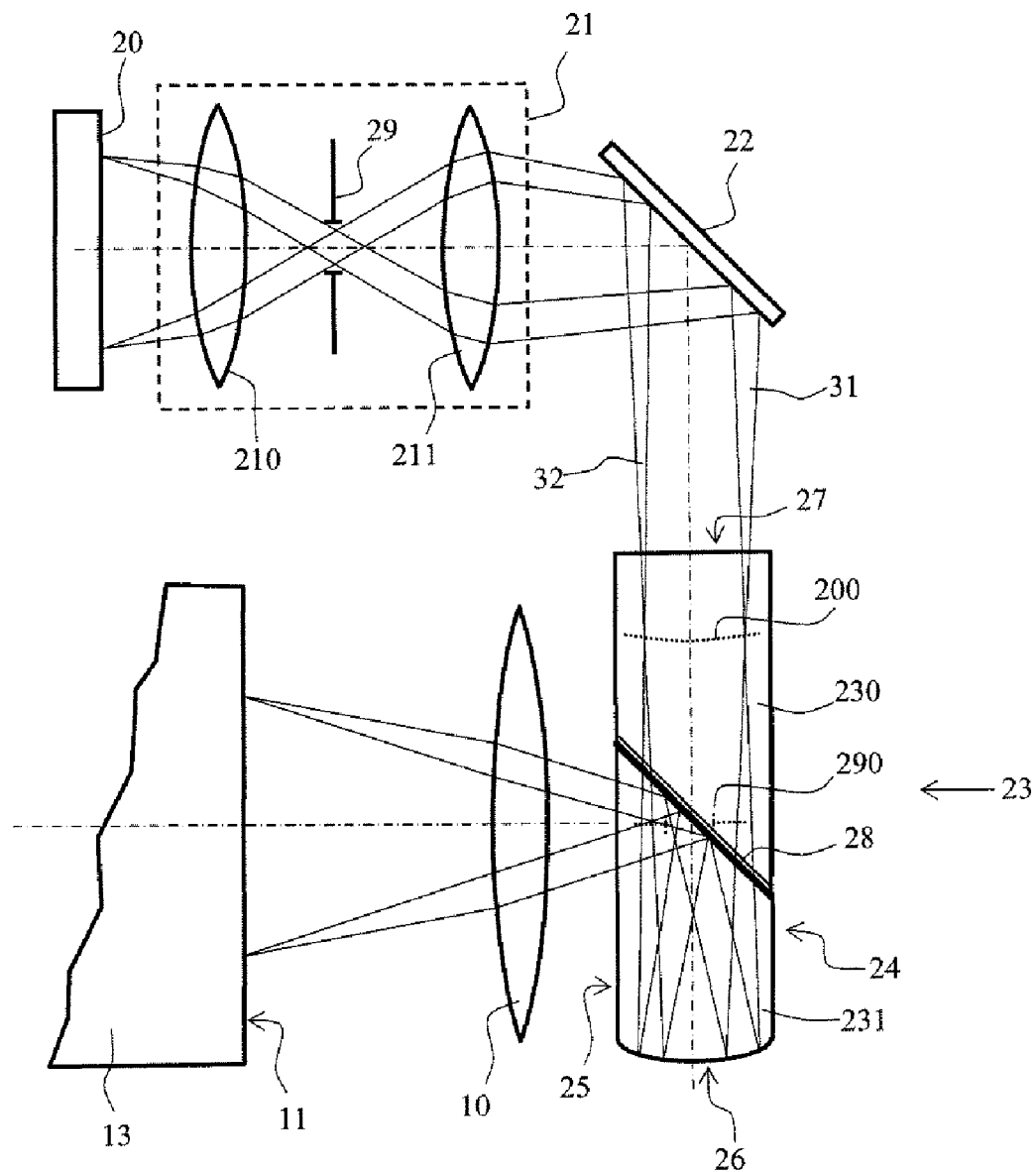
FIG. 4 shows a second view of the principle of the first optical device according to the invention.
Figure 5:
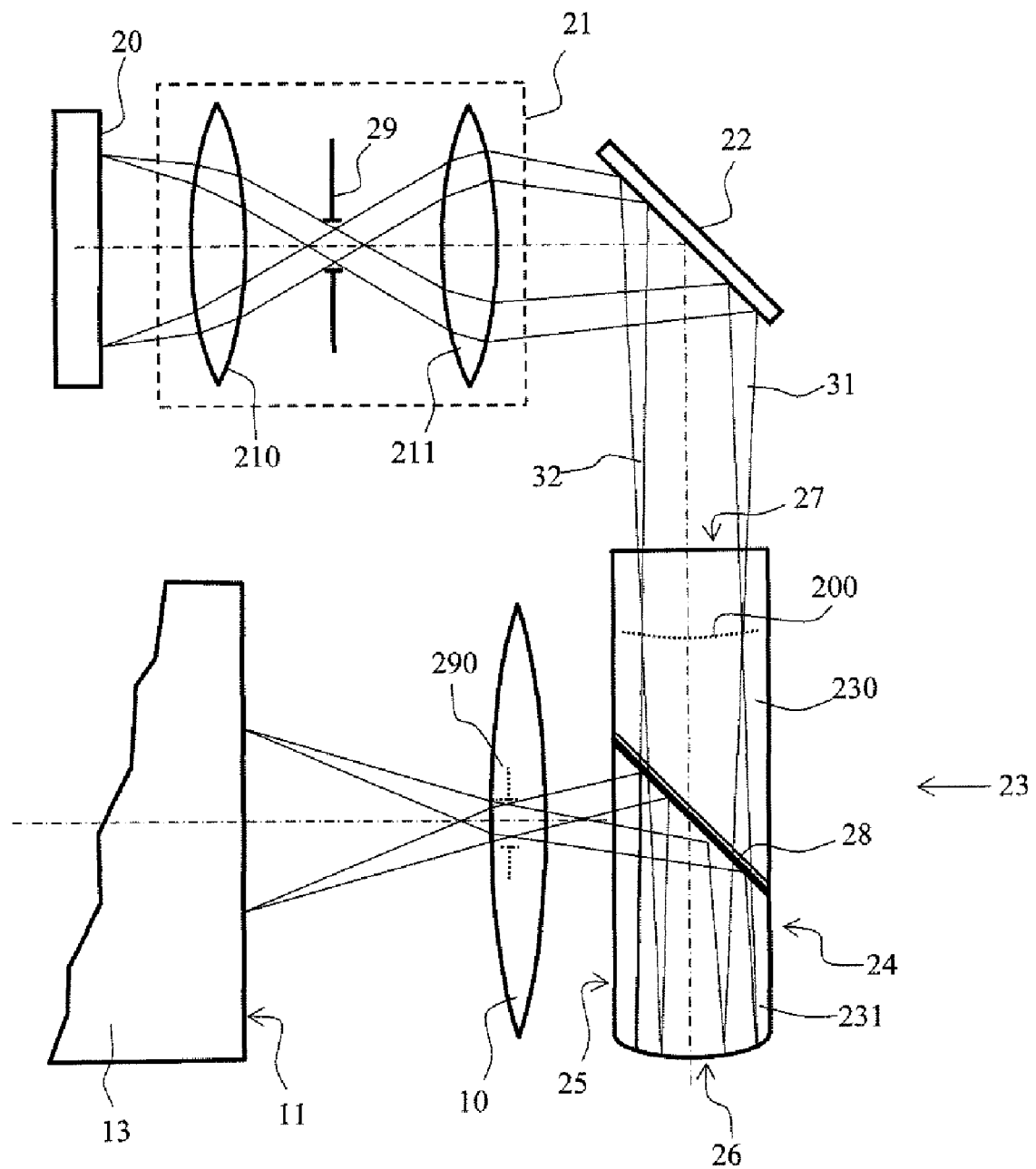
FIG. 5 shows a third view of the principle of a second optical device according to the invention, the aperture of this second device being arranged differently.

FIGS. 3, 4 and 5 show the principle of the optical device for superposing images according to the invention. It essentially comprises:

an image source 20;
an optical relay 21; and
an optical combiner 23.

The optical device is placed in front of an optical module comprising at least:

an objective 10; and
a photosensitive or photoemissive surface 11 placed in the focal plane of said objective, said surface belonging, for example, to an amplifier device 13.

The image source may conventionally be a cathode ray tube or else a flat screen which may be:

a liquid crystal display, known by the acronym LCD; or
organic light-emitting diodes, known by the acronym OLED.

It is important that the optical characteristic of the image source be suited to the characteristics of the photoemissive surface. Thus, in the case where the photosensitive surface is that of a light-intensifying device, it is important that the following three points are true of the image source:

resolution equivalent to that of the photosensitive surface;
spectral distribution in the spectral sensitivity range of the photosensitive surface;
brightness level emitted in the acceptable brightness range by the photosensitive surface.

The optical combiner 23 is formed of two optical parts 230 and 231 of the same optical index assembled via a common, approximately plane face 28. It has the general form of a plate with plane parallel faces 24 and 25.

This plate is positioned in front of the objective 10, approximately perpendicular to its optical axis.

The common face 28 is inclined at about 45 degrees to said plane faces. The common face 28 has a weakly reflective coating, the reflection coefficient of this coating being much less than 10% in the spectral band used by the photosensitive surface 11.

The optical combiner 23 comprises an entrance face 27 and an opposing face 26 that are approximately perpendicular to said plane faces 24 and 25. The entrance face 27 may be plane or spherical. The opposing face 26 has approximately the form of a reflecting spherical surface. This surface may optionally be rendered aspherical to improve the correction of geometrical optical aberrations. The combiner 23 works in the following way. The light rays coming from the optical relay 21 penetrate the entrance face 27, pass through the common face 28, which is semireflective, a first time, are collimated by the spherical surface 26 and reflected by the same semireflective common face 28. The photometric efficiency of the combiner 23 does not exceed a few percent, but this is not of great importance insofar as for nighttime applications the image may be of very low brightness.

The optical relay 21 is positioned between the image source 20 and the optical combiner 23. It comprises one or more optical modules 210 and 211 bringing together one or more simple lenses. It is arranged so as to provide an intermediate image 200 of the image source in the focal plane of the spherical surface of the opposing face 26.

The optical relay comprises a small aperture 29. In the first device shown in FIGS. 3 and 4, the aperture 29 is positioned such that its pupil image 290 forms, after reflection at the spherical surface 26, approximately in the vicinity of the common face 28.

In the second device represented in FIG. 5, the aperture is positioned such that its image forms, after reflection at the spherical surface 26 and at the common plate 28, approximately substantially to the outside of the combiner, such that, when the device is placed in front of the objective, said pupil image forms inside the objective. This arrangement is particularly advantageous insofar as, in this configuration, there may be agreement or quasi-agreement between this pupil image and the aperture of the objective. In this way any problem of vignetting the optical field provided by the image source is avoided and in this case it becomes possible to present an electronic image in a visual field as large as that of the objective.

In FIGS. 3, 4 and 5 the optical axes common to the optical relay and the combiner are represented as dot-dashed lines. The paths of the emitted light rays are represented as thin continuous lines.

For the sake of clarity, in FIG. 3 only the light rays emanating from the center of the field are shown, and in FIGS. 4 and 5 only the light rays emanating from the edges of the field are shown.

Figure 6:
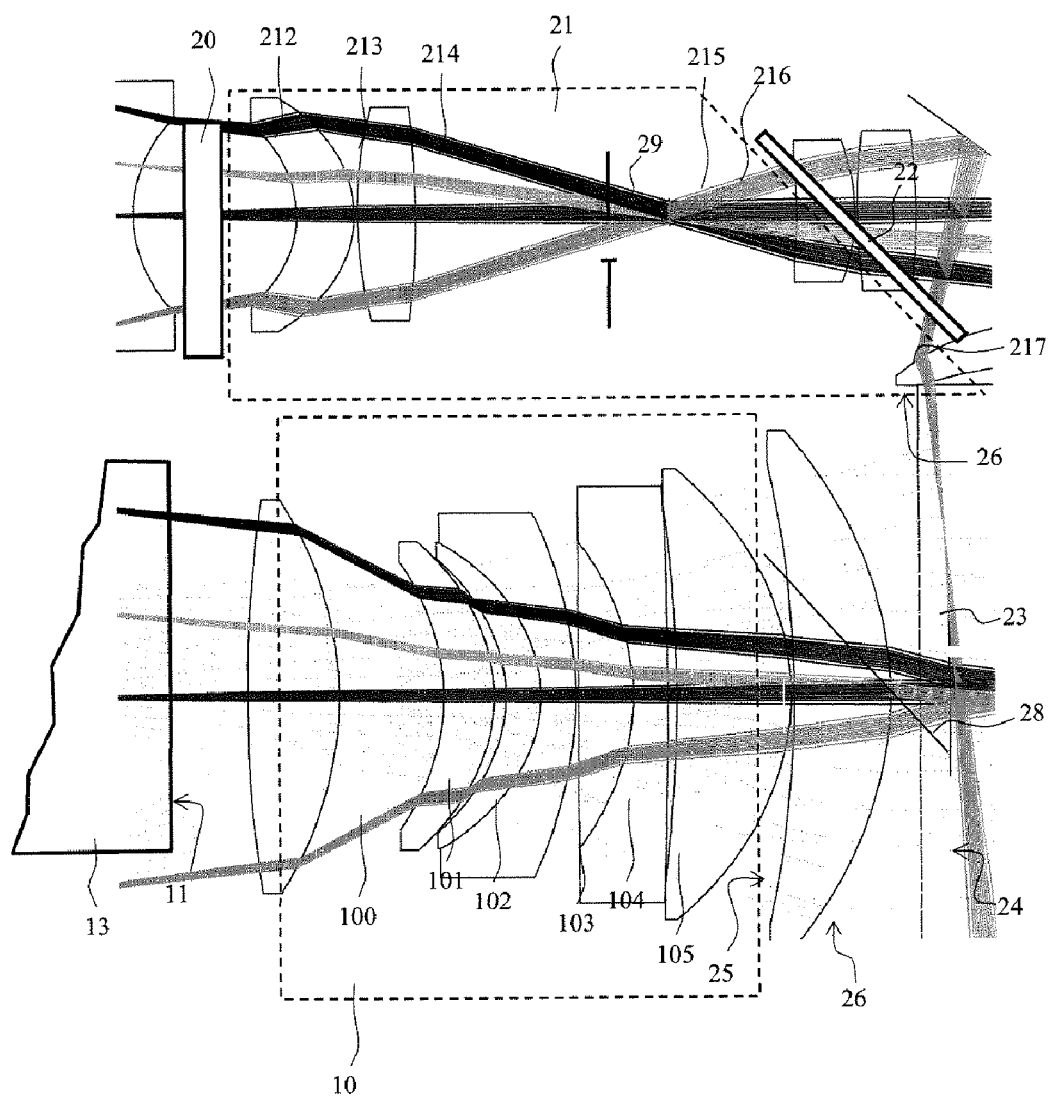
FIG. 6 shows a cross-sectional view of the optical elements of a first device according to the invention.
Figure 7:
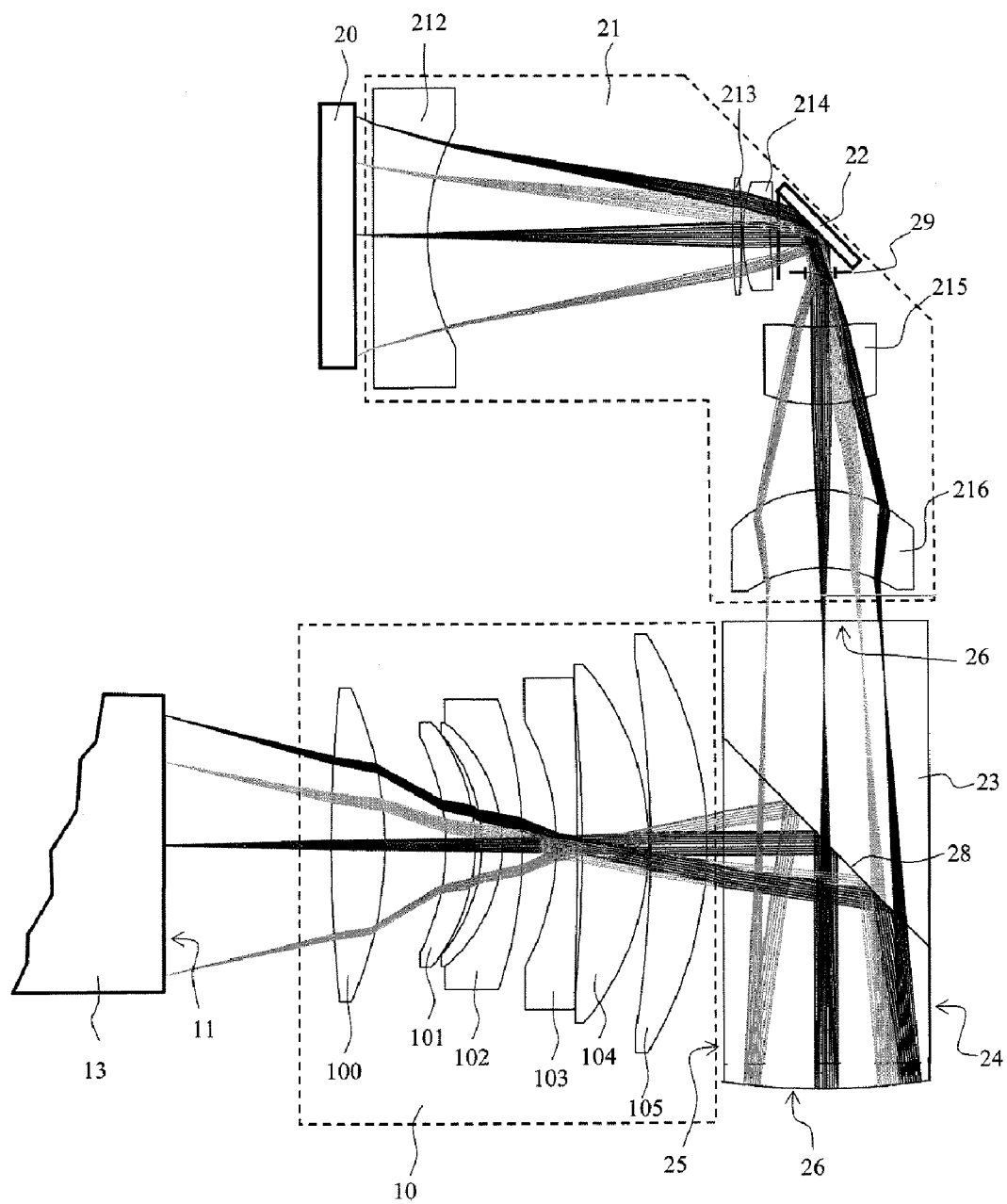
FIG. 7 shows a cross-sectional view of the optical elements of a first device according to the invention.

FIGS. 6 and 7 show two simulated optical combinations comprising both an optical image superposition device according to the invention and the objective of the optical module in front of which the combiner is positioned. These simulations were performed using the optical calculation software Code V.

In each figure, four beams of light rays are shown in gray tones: the first represents the center of the field taken at the center of the image source, the second and the third represent the edges of the field taken at the edges of the image source, the fourth represents a middle part of the field. In the first device shown in FIG. 6, the pupil image 290 is situated in the vicinity of the common face 28. In the second device shown in FIG. 7, the pupil image 290 is situated inside the objective 10.

Referring to FIG. 6, the image source 20 has a usable diameter of 12 millimeters.

The optical relay has the following characteristics:
optical combination of 6 lenses divided into 2 groups of 3 lenses, marked 212 to 217, arranged on both sides of the aperture 29;
image magnification: 0.75;
aperture magnification: 1;
total length: 40 millimeters;
diameter: 15 millimeters; and
aperture diameter: 1 millimeter.

The optical combiner 23 has the following characteristics:
total length: 30 millimeters;
thickness: 10 millimeters;
radius of curvature of the spherical surface: 40 millimeters;
optical transmission in the scenery path >90%; and
optical transmission in the image-source path <10%.

Referring to FIG. 7, the image source 20 has a usable diameter of 18 millimeters.

The optical relay has the following characteristics:
optical combination of 5 lenses divided into 2 groups of 3 and 2 lenses, marked 212 to 216, arranged on both sides of the aperture 29;
image magnification: 0.5;
aperture magnification: 1;
total unfolded length: 60 millimeters;
diameter: 25 millimeters; and
aperture diameter: 1 millimeter.

The optical combiner 23 has the following characteristics:
total length: 30 millimeters;
thickness: 15 millimeters;
radius of curvature of the spherical surface: 40 millimeters;
optical transmission in the scenery path >90%; and
optical transmission in the image-source path <10%.

Referring to FIGS. 6 and 7, the objective has the following characteristics:
optical combination of 6 lenses, marked 100 to 105;
focal length: 22 millimeters;
aperture: 20 millimeters;
focal surface: 20 millimeters;
total length: 30 millimeters; and
diameter: 25 millimeters.

It will be readily seen by one of ordinary skill in the art that the present invention fulfills all of the objects set forth above.

After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

What is claimed is:

1. An optical device for superposing images, constructed to be positioned in front of an optical module, the optical device having an objective and a photosensitive or photoemissive surface positioned in the focal plane of said objective, said device comprising at least an image source and an optical combiner, said combiner:
   being formed of two optical parts assembled via an approximately plane common face;
   wherein the combiner has the general form of a plate with plane parallel faces, said common face being inclined at around 45 degrees to said plane faces;
   wherein said combiner has an entrance face and a opposing face that are approximately perpendicular to said plane faces;
   wherein the opposing face has approximately the form of a reflecting spherical surface and in that the common face has a weakly reflective coating, the reflection coefficient of this coating being less than 10% in the spectral band used by the photosensitive surface; and
   said combiner being constructed to be positioned in front of the objective such that the plane parallel faces are approximately perpendicular to the optical axis of said objective.

2. The optical device as claimed in claim 1, wherein the reflection coefficient of this coating is less than 1% in the spectral band used by the photosensitive or photoemissive surface.

3. The optical device as claimed in claim 1, comprising an optical relay positioned between the image source and the optical combiner, arranged so as to provide an intermediate image of the image source in the focal plane of the spherical surface of the opposing face.

4. The optical device as claimed in claim 3, wherein the optical relay comprises an aperture that is small in size compared to that of the objective.

5. The optical device as claimed in claim 4, wherein said aperture is positioned in such a way that its image forms, after reflection at the spherical surface, in the approximate vicinity of the common face.

6. The optical device as claimed in claim 4, wherein said aperture is positioned in such a way that its image forms, after reflection at the spherical surface and at the common plate, substantially to the outside of the combiner, such that, when the device is placed in front of the objective, said pupil image forms inside the objective.

7. Night vision goggles comprising at least one objective, one light-intensifying device and one eyepiece, wherein an optical device for superposing images as claimed in claim 1, is placed in front of said objective.

* * * * *